(12) United States Patent
Lee (10) Patent No.: US 10,545,457 B2
(45) Date of Patent: Jan. 28, 2020

(54) OPTICAL PROJECTOR WITH OFF-AXIS DIFFRACTIVE ELEMENT AND CONJUGATE IMAGES

(71) Applicant: K Laser Technology, Inc., Hsinchu (TW)

(72) Inventor: Wai-Hon Lee, Los Altos, CA (US)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 16/297,495

(22) Filed: Mar. 8, 2019

(65) Prior Publication Data

US 2019/0204782 A1    Jul. 4, 2019

Related U.S. Application Data

(63) Continuation-in-part of application No. 15/832,682, filed on Dec. 5, 2017, now Pat. No. 10,310,281.

(51) Int. Cl.
*G03H 1/08* (2006.01)
*G03H 1/22* (2006.01)
*G02B 27/09* (2006.01)
*G03H 1/02* (2006.01)

(52) U.S. Cl.
CPC ........... *G03H 1/08* (2013.01); *G02B 27/0955* (2013.01); *G02B 27/0977* (2013.01); *G03H 1/2202* (2013.01); *G03H 2001/0216* (2013.01)

(58) Field of Classification Search
CPC .................. G03H 1/08; G03H 1/2202; G03H 2001/0216; G02B 27/0955; G02B 27/0977; G02B 27/0037; G02B 27/0043; G02B 27/0944; G02B 27/1086; G02B 27/1093; G02B 27/60; G06T 7/521
See application file for complete search history.

(56) References Cited

U.S. PATENT DOCUMENTS

| | | |
|---|---|---|
| 6,188,062 B1 | 2/2001 | Lee |
| 7,699,516 B1 | 4/2010 | Lee |
| 2008/0240502 A1 | 10/2008 | Freedman et al. |
| 2009/0185274 A1 | 7/2009 | Shpunt |
| 2010/0007717 A1 | 1/2010 | Specktor et al. |

(Continued)

FOREIGN PATENT DOCUMENTS

| | | |
|---|---|---|
| WO | 2007043036 A1 | 4/2007 |
| WO | 2007105205 A2 | 9/2007 |
| WO | 2008120217 A2 | 10/2008 |

OTHER PUBLICATIONS

Wai-Hon Lee, "Computer-Generated Holograms: Techniques and Applications," 1978, pp. 121-232, vol. XVI, Progress Optics, edited by E.Wolf, North-Holland Publishing Company, Amsterdam New York Oxford.

(Continued)

*Primary Examiner* — Kimberly N. Kakalec
(74) *Attorney, Agent, or Firm* — Kilpatrick Townsend & Stockton LLP (57) ABSTRACT

In an embodiment, an off-axis hologram is provided. The off-axis hologram creates two, conjugate images which are on either side (off-axis) of the 0-order beam. A Multiple Beam Grating (MBG) is used to both duplicate the conjugate images and to redirect the images along the axis. The 0-order beam is blocked before or at the MBG. The MBG projects the images onto a 3D surface, such as a person's face.

20 Claims, 12 Drawing Sheets

(56) References Cited

U.S. PATENT DOCUMENTS

| | | | |
|---|---|---|---|
| 2011/0075259 A1 | 3/2011 | Shpunt | |
| 2012/0262553 A1* | 10/2012 | Chen | G01B 11/25 348/47 |
| 2013/0038881 A1 | 2/2013 | Pesach et al. | |
| 2013/0170004 A1 | 7/2013 | Futterer | |
| 2014/0168774 A1* | 6/2014 | Zhao | G01N 21/9501 359/566 |
| 2014/0307307 A1 | 10/2014 | Georgiou et al. | |
| 2014/0376092 A1 | 12/2014 | Mor | |
| 2015/0097947 A1* | 4/2015 | Hudman | G01S 17/89 348/136 |
| 2015/0253123 A1 | 9/2015 | Braker et al. | |
| 2016/0025993 A1 | 1/2016 | Mor et al. | |
| 2016/0223724 A1 | 8/2016 | Hudman | |
| 2016/0265906 A1 | 9/2016 | Yamashita et al. | |
| 2016/0309135 A1 | 10/2016 | Ovsiannikov | |
| 2017/0287151 A1 | 10/2017 | Han et al. | |
| 2017/0302907 A1* | 10/2017 | Wallius | H04N 13/254 |
| 2018/0010907 A1* | 1/2018 | Forster | G01B 11/2513 |

OTHER PUBLICATIONS

Wai-Hon Lee, "High Efficiency Multiple Beams Gratings," Applied Optics, Jul. 1, 1979, pp. 2152-2158, vol. 18, Optical Society of America.

Spagnolo, "Diffractive optical element-based profilometer for surface inspection," 2001, Opt. Eng. 40(1), pp. 44-52 (Year: 2001).

"Apple VSCEL supplier suggests TrueDepth coming to multiple iPhones this fall." Retrieved on Jun. 28, 2018. Retrieved from the Internet: https://appleinsider.com/articles/18/03/08/apple-vcsel-supplier-suggests-truedepth-coming-to-multiple-iphones-this-fall_ 11 pages.

"Lumentum Has Leg Up on Finisar in First iPhone X Units, Say Piper, Raymond James." Retrieved on Jun. 28, 2018. Retrieved from the Internet: https://www.barrons.com/articles/lumentum-has-leg-up-on-finisar-in-first-iphone-x-units-say-piper-raymond-james-1505328034_3 pages.

Non-Final Office Action dated Apr. 20, 2018 issued in the U.S. Appl. No. 15/832,682, filed Dec. 5, 2017, 20 pages.

Final Office Action dated Oct. 16, 2018 issued in the U.S. Appl. No. 15/832,682, filed Dec. 5, 2017, 18 pages.

Notice of Allowance dated Jan. 9, 2019 issued in the U.S. Appl. No. 15/832,682, filed Dec. 5, 2017, 5 pages.

Notice of Allowance dated Feb. 26, 2019 issued in the U.S. Appl. No. 15/832,682, filed Dec. 5, 2017, 8 pages.

Corrected Notice of Allowability dated Mar. 7, 2019 issued in the U.S. Appl. No. 15/832,682, filed Dec. 5, 2017, 2 pages.

Non-Final Office Action dated May 11, 2018 issued in the U.S. Appl. No. 15/879,367, filed Jan. 1, 2018, 20 pages.

Final Office Action dated Sep. 4, 2018 issued in the U.S. Appl. No. 15/879,367, filed Jan. 1, 2018, 21 pages.

Notice of Allowance dated Feb. 20, 2019 issued in the U.S. Appl. No. 15/879,367, filed Jan. 1, 2018, 8 pages.

* cited by examiner

OPTICAL PROJECTOR WITH OFF-AXIS DIFFRACTIVE ELEMENT AND CONJUGATE IMAGES

CROSS-REFERENCES TO RELATED APPLICATIONS

This application is a continuation-in-part application of Ser. No. 15/832,682 entitled "Optical Projector With Off-Axis Diffractive Element," filed on Dec. 5, 2017, now U.S. Pat. No. 10,310,281 issued Jun. 4, 2019, the disclosure of which is hereby incorporated in its entirety. This application is related to Ser. No. 15/879,367 entitled "Optical Projector With On Axis Hologram and Multiple Beam Splitter," filed on Jan. 24, 2018, now U.S. Pat. No. 10,317,684 issued Jun. 11, 2019.

BACKGROUND OF THE INVENTION

The present invention relates to optical projection using diffraction for uses such as three dimensional (3D) surface measurements for facial recognition or other purposes.

Optical projection of a pattern is used in applications such as 3D surface measurements. The positions of a pattern of dots caused by beams projected onto a flat surface can be determined. When the same pattern of dots is projected on a 3D surface to be measured, the positions of the dots will deviate from their designed positions as a result of the different intersection height on the 3D surface. These deviations can be measured and correlated to the different distances, or depth, of the 3D surface, and a 3D image can be generated.

Figure 1:
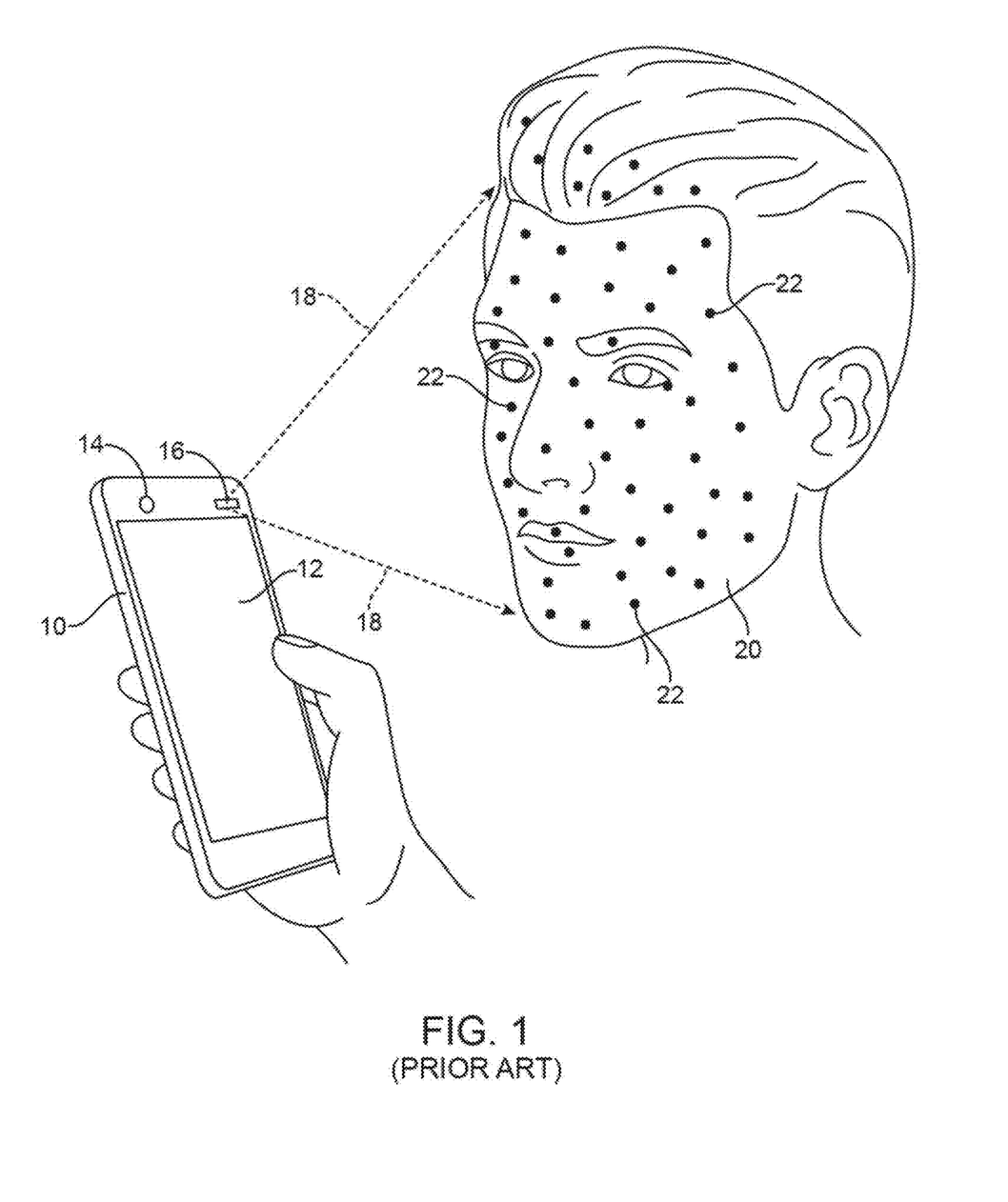
FIG. 1 is a diagram of a prior art optical projector in a smartphone.

FIG. 1 shows an example application of a miniaturized optical projector for depth measurements. A smartphone 10 includes a display 12, a camera 14 and an internal processor and other electronics. Display 12 can be used for presenting information to a user, and also functions as a touch screen for inputting information. An optical projector/detector module 16 is provided. Projector/detector module 16 projects an IR image which diverges as shown by arrows 18. The IR image is projected onto a user's face 20 as a series of dots 22. A detector in optical projector/detector module 16 then detects the dots 22, and from their relative positions, can determine the depth of the various parts of the user's face 20. By combining this with traditional two dimensional facial recognition, a user's face can be detected with great accuracy.

Figure 2:
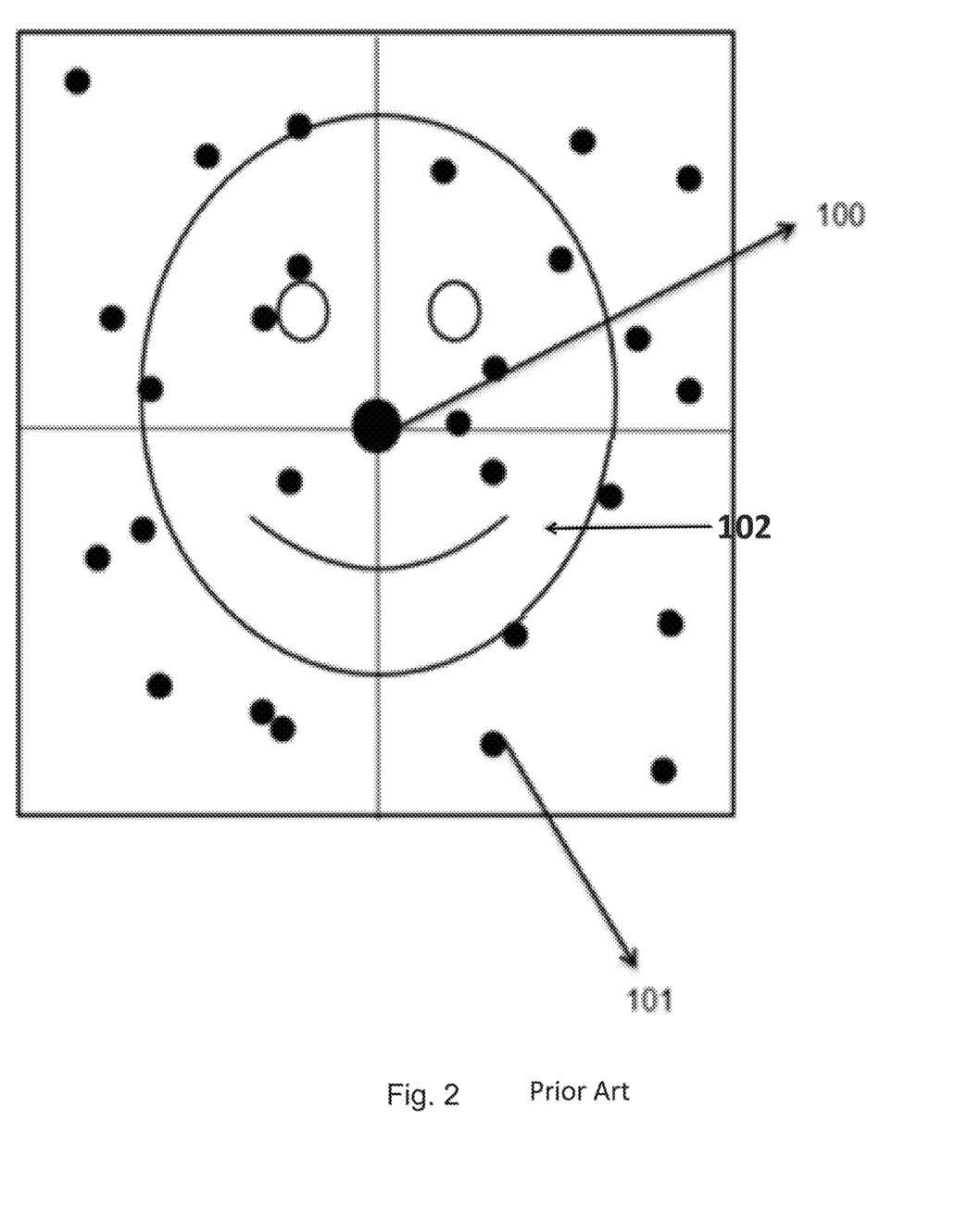
FIG. 2 is an example of a prior art on-axis diffraction pattern.

One configuration uses a laser beam which is divided into multiple beams to generate the pattern of dots on the 3D surface, which are reflected back to a detector. FIG. 2 shows an example of a pattern of beams/dots, such as beam 101, projected onto a face 102. When a Diffractive Optical Element (DOE) is used to divide the incoming beam into N beams according the pattern design, the power of each diffracted beam (e.g., $1^{st}$ order beam 101) is roughly equal to $\eta P/N$ where $\eta$ is the diffraction efficiency and P is the incoming laser power. In most cases, the diffraction efficiency cannot reach 100 percent. The remaining power $(1-\eta)P$ will remain in the un-diffracted beam ($0^{th}$ diffracted order), shown as beam 100, and scattering noise. The ratio of the power between the un-diffracted beam ($0^{th}$ diffracted order) to one of the diffracted order is equal to $(1-\eta)N/\eta$. For large N such as 1000 or more, even with 98% efficiency, each diffracted beam will have 0.098% of the incoming laser power and the $0^{th}$ order has 2% of the incoming laser power. That means the $0^{th}$ order has more than 20 times more laser power than the other diffracted orders. In order to detect the diffracted dot (101), a remote sensor may require the diffracted dot to have certain amount of laser power.

When used for facial detection, the laser power must be limited to avoid damaging the person's eyes. Even with non-visible IR lasers, too high a power of the laser can result in burning the retina. Because the $0^{th}$ order 100 is 20 times higher, the laser power at the $0^{th}$ order may exceed the minimum power for the safety of the eye.

US Published Patent Application No. 2011/0075259 described a technique to reduce the ratio of $0^{th}$ order power to the diffracted order power by sub-dividing the DOE into M DOEs. Each sub DOE will have N/M dots. Now for each diffractive order in a sub DOE, the laser power of each diffractive beam is $\eta P1M/N$. P1 is the laser power striking on each sub DOE. Under the best circumstances P1 for each sub DOE is equal to P/M. As a result the laser power of each diffracted beam is unchanged and equal to $\eta P/N$. On the other hand the of $0^{th}$ order power of each sub DOE is only $(1-\eta)P/M$. The ratio of the power between the un-diffracted beam ($0^{th}$ diffracted order) to one of the diffracted order is now equal to $(1-\eta)N/M\eta$. Let's continue with the previous example and assume M is equal to 9. The $0^{th}$ order beam to the diffracted beam ratio becomes 2.26. As a result, there is significantly less chance for $0^{th}$ order to exceed the eye safety limit of laser power.

BRIEF SUMMARY OF THE INVENTION

In an embodiment of the present invention, an off-axis hologram is provided. The off-axis hologram creates two, conjugate images which are on either side (off-axis) of the 0-order beam (This is in contrast to an on-axis hologram, where the 0-order is minimized and a signal image is created, but is susceptible to noise if not manufactured exactly correctly to avoid interference between the +1 and −1 order beams.). A Multiple Beam Grating (MBG) is used to both duplicate the conjugate images and to redirect the images along the axis. The 0-order beam is blocked before or at the MBG. The MBG projects the images onto a 3D surface, such as a person's face.

In one embodiment, the 0-order beam is blocked by an opaque dot on a transparent substrate placed immediately in front of the MBG. Alternately, the film with the dot can be immediately after the MBG or on the MBG substrate itself.

In one embodiment, the laser beam is collimated. In another embodiment, the laser beam is not collimated, and diverges. A lens is placed after the off-axis hologram to reconverge the image at a plane, with the 0-order blocking dot being placed at the plane. The reconstructed images are then projected by a second lens through a MBG onto the surface of an object to be measured.

In the mass production of holograms there are many factors which can affect the efficiency of the hologram. Such factors include thickness control of the hologram surface, refractive index of the polymer used in reproducing the hologram and or the shrinkage of the polymer after production. With the off-axis approach, since the $0^{th}$ order is blocked within the optical projector and will not present any danger to the eyes, there is no need to worry about the effect of different production techniques on the brightness of the $0^{th}$ order beam. The production can either be done more inexpensively, or the best production techniques can be used to increase the diffraction efficiency.

In one embodiment, the off-axis hologram is used in an electronic device, such as a smartphone, to measure the depth features of a person's face or to determine the distance of a person's face from a camera. Calibration is done by calculating, or actually recording the calibration positions of a plurality of elements of the off-axis diffraction pattern as reflected off a flat surface and detected by the photodetector. Then, the measured positions of a plurality of elements of the off-axis diffraction pattern as reflected of a non-flat object to be measured, such as a person's face, are recorded. Then, the differences between the calibrated and measured positions are determined. From those differences, the change in depth can be determined. That information is used to generate a map of the depth of the non-flat object at different points and can be used for the recognition of the non-flat object.

DETAILED DESCRIPTION OF THE INVENTION

FIG. 2 is a diagram of an example of a pattern generated by an embodiment of the present invention where the DOE is an off-axis diffractive element. In contrast to the diffraction pattern shown in FIG. 1, the $0^{th}$ order beam 200 is near the bottom of the diffraction pattern. The $0^{th}$ order beam 200 is below the face 202 shown in FIG. 2. Since the $0^{th}$ order is away from the surface measurement area, we can implement a block to this $0^{th}$ order beam somewhere along the optical path. In theory, the $0^{th}$ order beam need not be blocked, since it does not come close to the person's eyes as shown in FIG. 2. However, since the pattern may move around as the user is preparing to use it, or it may be seen by someone standing near the user, it is better to completely avoid a high intensity $0^{th}$ order beam.

The construction of such an off-axis diffraction element is described, for example, in Wai-Hon Lee, Computer-Generated Holograms: Techniques and Applications, reprinted from Progress in Optics, 1978, and Wai-Hon Lee U.S. Pat. No. 7,699,516, the disclosures of which are hereby incorporated herein by reference. In general, an off-axis diffraction pattern is created by a computer generated hologram (CGH). Suppose that the projected dot pattern is represented by a function f(x,y) and F(u,v) is its Fourier transform. The mathematical representation of the CGH is given by $$H(u,v) = |F(u,v)|\{1 + \cos(2\pi u/T + \varphi(u,v))\} \quad (1)$$

Where $\varphi(u,v)$ is the phase of the complex function F(u,v) and T is related to the diffraction angle $\Theta$ by the formula sin $\Theta/\lambda$. A laser recording device is then used to plot the function H(u,v) on photographic film or photoresist. The resulting CGH is the off axis diffraction element which may be used in an embodiment of this invention.

Figure 3:
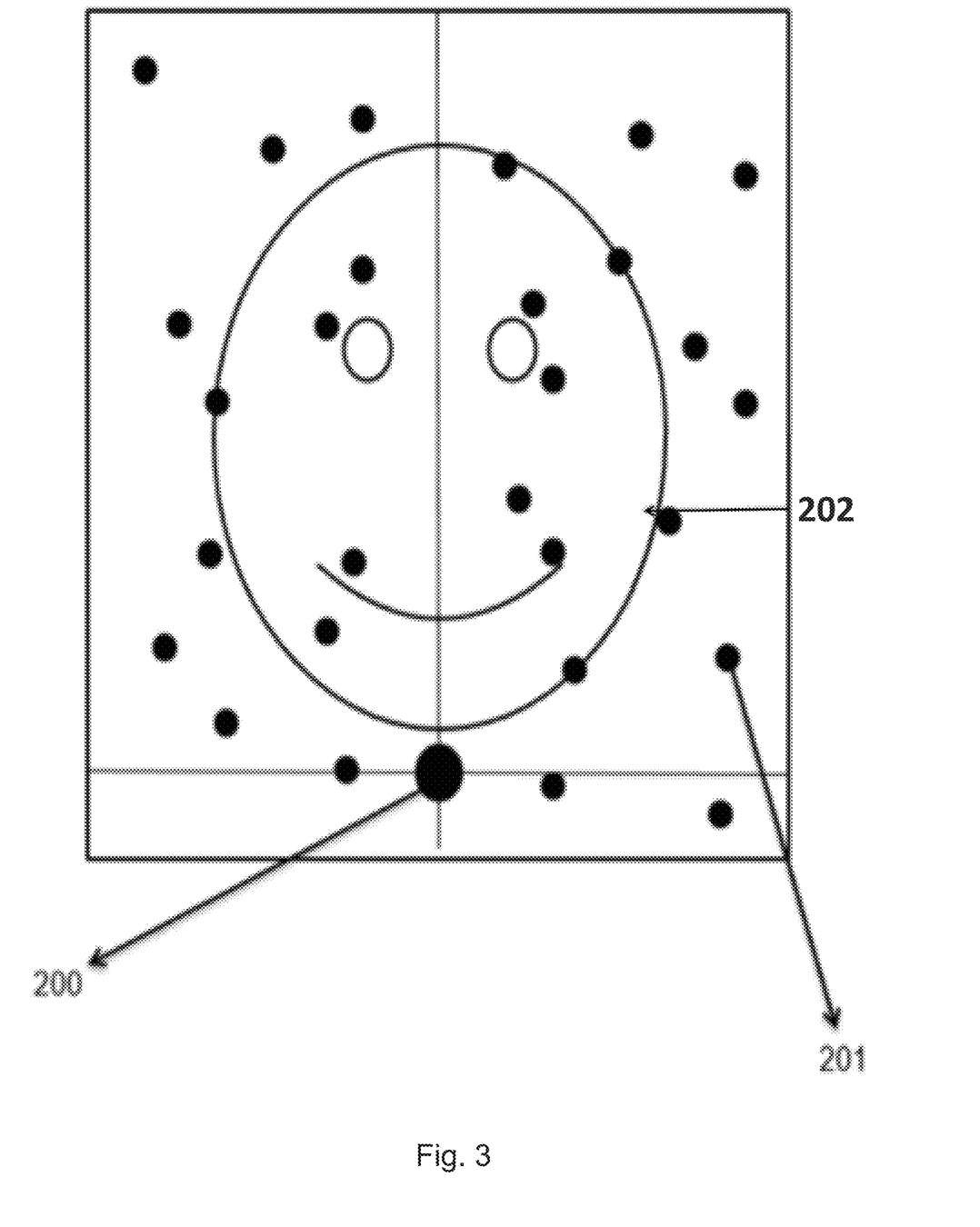
FIG. 3 is an example of an off axis diffraction pattern according to an embodiment.

FIG. 3 is a diagram of a first embodiment of the present invention. A laser 300 is shown, which is an edge emitting laser in one embodiment. The diverging beam from the laser 300 is collimated by a collimating lens 301 to produce a collimated beam. The collimated laser beam is then transmitted through an off-axis DOE 303 to produce a group of diffracted beams 302. The beams 302 diffracted by DOE 303 are incident on mirror 304. As shown, beam 305 is the 0th order beam which is the continuation of the laser beams 302. Beam 305 is stopped by a block 306. Arrow 307 represents all the non-0 order off axis beams emerging from the optical projector toward a person's face or other 3D object. The dotted line 310 is the normal to the mirror surface. The center of the diffracted bundles is normal to beam 302.

Block 306 preferably has a low reflective, light diffusing surface such that any reflected portion of the $0^{th}$ order beam is at least less bright than a second order diffraction beam. Ideally, any light from the $0^{th}$ order beam is either uniformly dispersed, or is significantly less than the brightness of any higher order beam in the off-axis diffraction pattern. In this way, any reflection of the $0^{th}$ order beam will not be picked up by mirror 304 and impact the measurement of the pattern.

Figure 4:
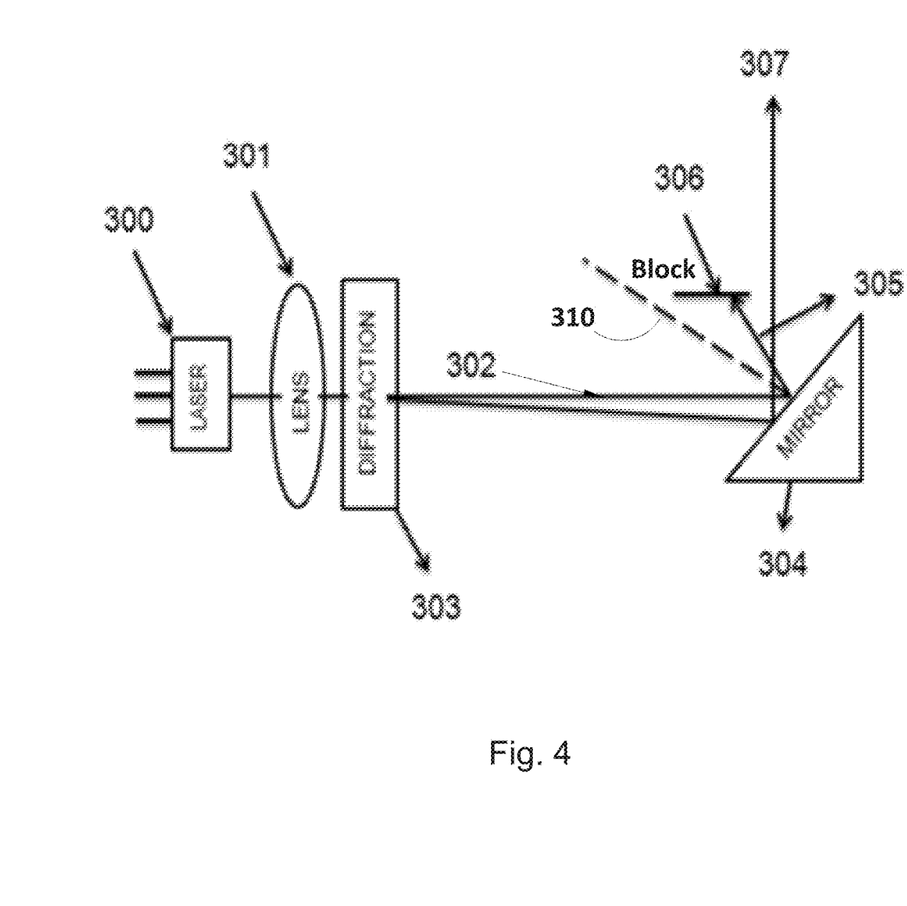
FIG. 4 is a first embodiment of an optical projector using off-axis DOE.

FIG. 4 shows a second embodiment of this current invention. In this embodiment the off axis DOE 403 is a reflective element—the diffractive element and the mirror are combined. Again the $0^{th}$ order beam 405 is blocked by a block or stop 406. Arrow 407 represents all the off axis beams emerging from the optical projector. An advantage of this embodiment is the need for fewer parts, since the DOE and reflective element are combined. However, this results in the $0^{th}$ order beam not having as much separation from the other beams in the pattern by the time it hits block 406. This can present a manufacturing challenge for obtaining the needed precise placement. Alternately, the diffraction pattern can be varied to create quicker divergence of beams, or the block can be placed further from the combined DOE/reflector 403. The dotted line 410 is the normal to the mirror surface. The center of the diffracted bundles is normal to beam 402.

Figure 5:
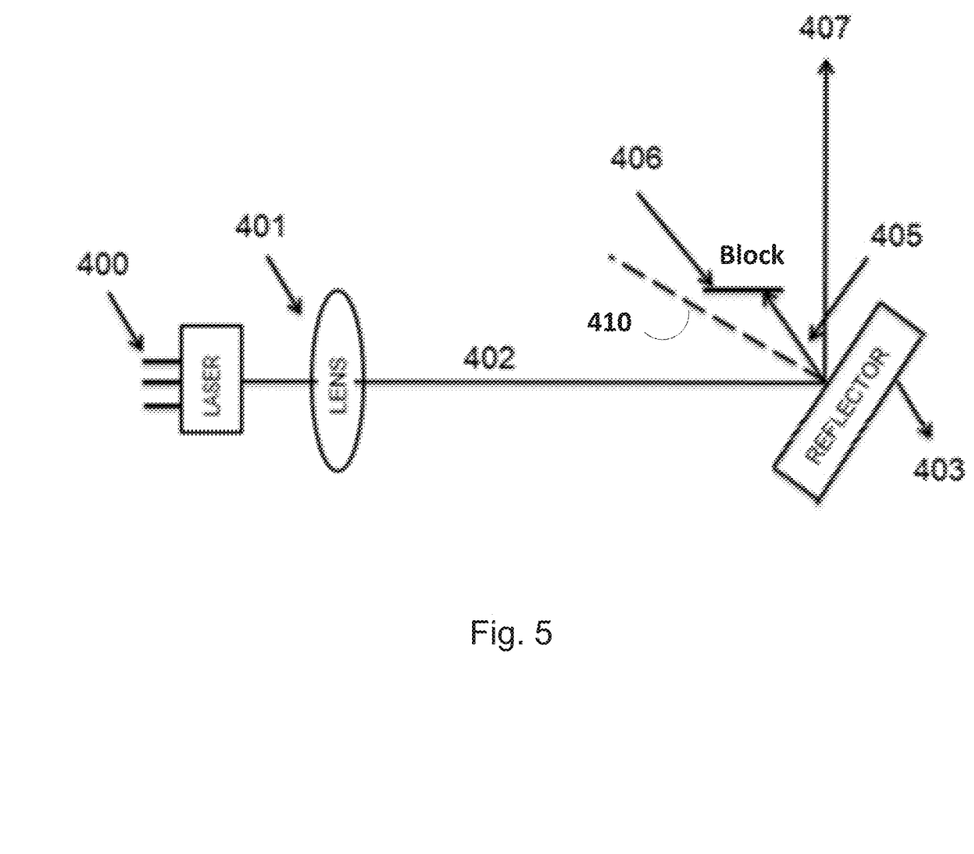
FIG. 5 is a second embodiment of an optical projector using off axis DOE.

FIG. 5 shows a third embodiment of this current invention. The optical axis of laser 500 is not along the optical axis 502 of the lens 501. This is a different way to produce an off-axis diffraction pattern, rather than having the laser axis along the lens axis, and using the diffraction pattern to diffract the $0^{th}$ order beam to an off-axis position. As a result, the collimated beam 505 is incident on the DOE at an angle. The diffracted beam 507 from the DOE is then reflected by mirror 504 and exits the projection unit housing 510 through an opening 512. The $0^{th}$ order beam 505 as shown does not need to be blocked because it is sufficiently off-axis to not be reflected by the mirror 504. The $0^{th}$ order beam will then go past mirror 504, and impact the inside of a housing 510. By coating or otherwise manufacturing the inside of housing 510 to have a low reflectivity, light diffusing surface, reflections of the $0^{th}$ order beam will not interfere with the diffraction pattern. In one embodiment, the angle of the mirror is not 45 degree and is determined by the incident angle of the laser beam and the diffraction angle of the off axis device.

In an alternate embodiment, a surface emitting laser can be used to replace the edge emitting lasers in the previous embodiments. In one embodiment, the laser is a vertical cavity surface emitting laser (VCSEL).

Figure 6:
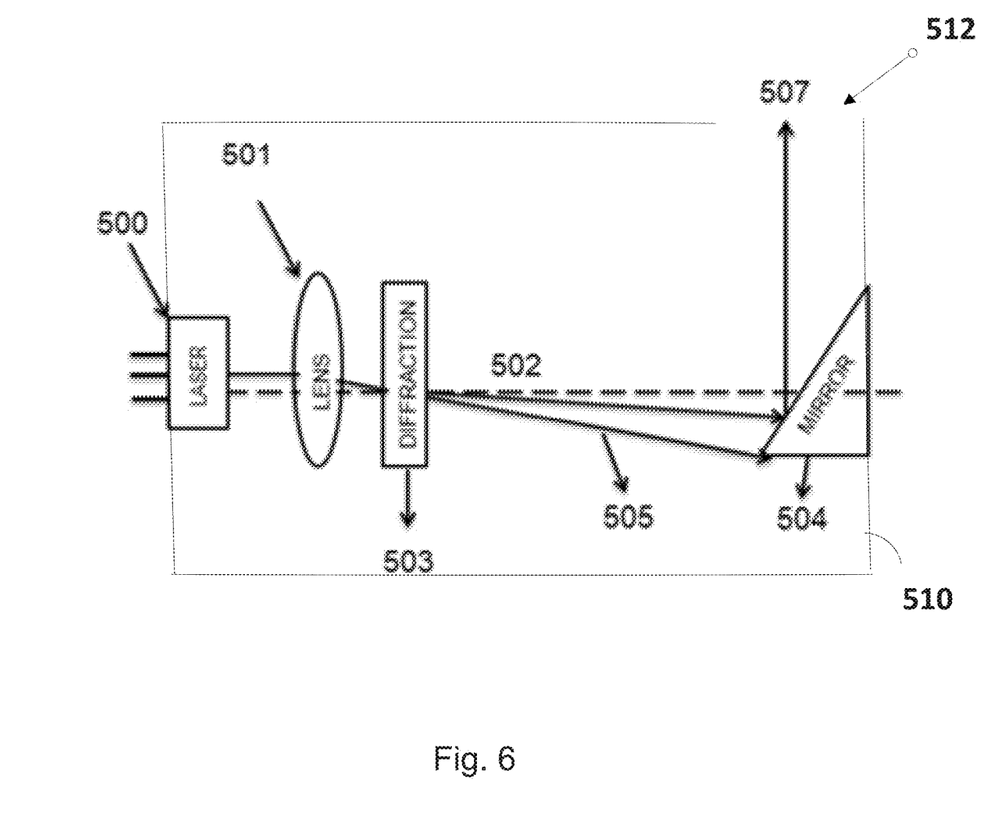
FIG. 6 is a third embodiment of an optical projector using off axis DOE.

FIG. 6 shows an embodiment of a hybrid laser and photo detector module which can be adapted to be used in one embodiment of the invention, as shown in more detail in Wai-Hon Lee U.S. Pat. No. 6,188,062, the disclosure of which is hereby incorporated herein by reference. A photo detector device 200 is shown to have a V-shaped groove 210 etched on its surface. The photo detector is fabricated on a special silicon wafer which has a crystal plane subtending a 45 degree angle with respect to the surface of the wafer as shown in FIG. 2. A mirror 220 is attached to that 45 degree surface by means of adhesive or metallic bonding material such as thin solder. A corrugated structure with period T has been etched on top surface 230 of the mirror 220.

The corrugated structure is designed to split the laser beam into the diffraction pattern. Laser chip 240 is attached to pad 250 on the photo detector by means of electrically conductive adhesive. A bonding pad 260 allows electrical connection be made to the bottom of the laser chip 240. A light sensitive area 270 behind the laser chip 240 is to detect the back light emission from the laser chip and thus serves as a laser power monitor. Pad 272 is for connecting to the anode of the detector element 270. On the back side of the mirror 220 is a set of photo detectors 280 which has six elements, a,b,c,d,e, and f in this embodiment. Additional detector elements can be implemented for multichannel readouts. Pads 281,282,283,284,285,286 are respectively for the anodes of the detectors a,b,c,d,e, and f. The back surface of the detector 290 provide the contact to the cathode of all the light sensitive elements.

Figure 7:
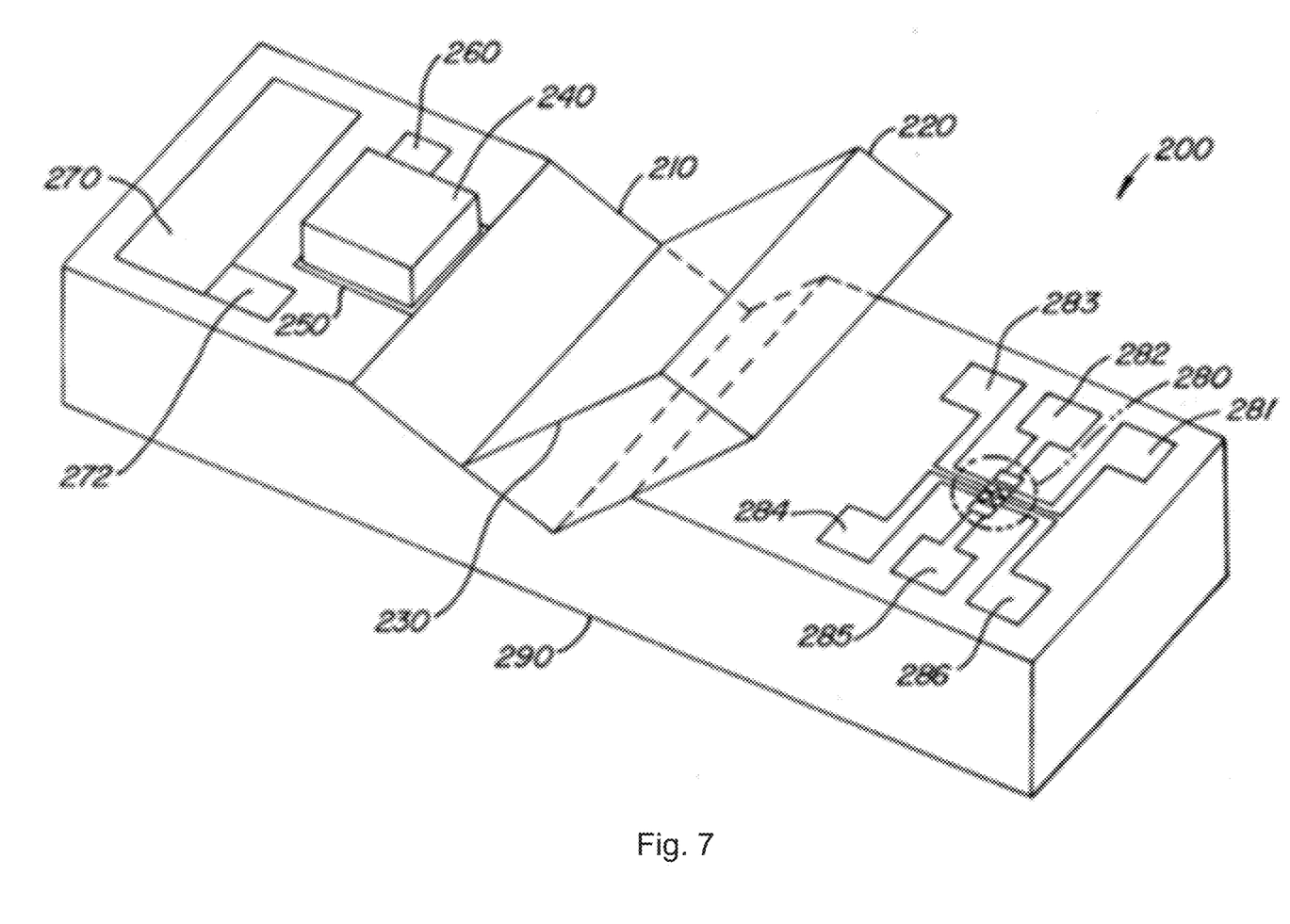
FIG. 7 shows an embodiment of a hybrid laser and photo detector module which can be used in one embodiment of the invention.

FIG. 7 shows an embodiment of an electronic device 702, such as a smartphone. Device 702 has a display 704 for presenting information to a user, and also functions as a touch screen for inputting information. An optical module 706 is provided, and may include the elements of one of the embodiments of FIGS. 3-6. The photodetector can be part of optical module 706, or can be separately mounted on electronic device 702.

Figure 8:
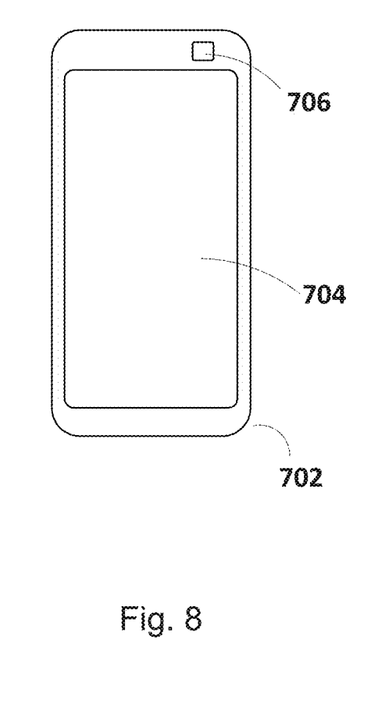
FIG. 8 is a diagram of a smartphone with an integrated optical projector with an off-axis DOE in one embodiment of the invention.
Figure 9:
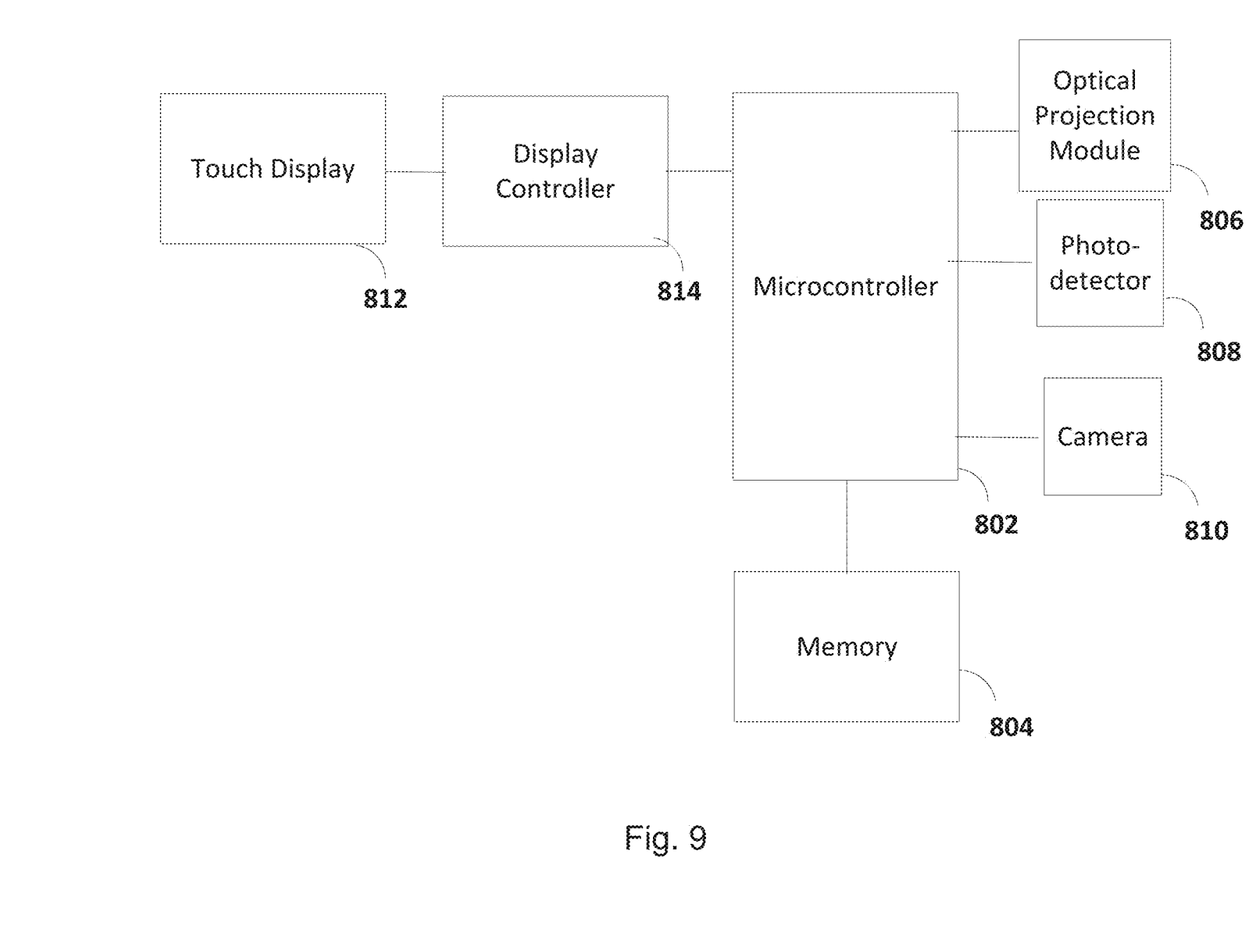
FIG. 9 is a block diagram of the components of a smartphone with an integrated optical projector with an off-axis DOE in one embodiment of the invention.

FIG. 8 is a block diagram of the electronics of an embodiment of an electronic device such as device 702 of FIG. 7. A microcontroller 802, such as a microprocessor, controls the operation of the electronic device. A memory 804 contains the stored program for operating microcontroller 802, along with data storage. Memory 804 can be a flash or other solid state memory in one embodiment, and can be one or multiple memory chips.

A touch display 812 is controlled by a display controller 814, under the direction of microcontroller 802. The touch display provides both user inputs, and provides display information to the user. Optical projection module 806 may be one of the embodiments shown in FIGS. 2-5. A separate photodetector 808 is shown, although it could be integrated into optical projection module 806. A camera 810 is also provided, and other components (not shown) may be included in the electronic device.

In one embodiment, the off-axis DOE is used in an electronic device, such as a smartphone, to measure the depth features of a person's face or to determine the distance of a person's face from a camera. A program in memory 804 controls microcontroller 802 to control camera 810 and optical projection module 806 to provide a composite image of a person's face. Calibration is done by recording the calibration positions of a plurality of elements of the off-axis diffraction pattern as reflected off a flat surface and detected by the photodetector. Then, the measured positions of a plurality of elements of the off-axis diffraction pattern as reflected of a non-flat object to be measured, such as a person's face, are recorded. Then, the differences between the calibrated and measured positions are determined. From those differences, the change in depth can be determined. That information is used to generate a map of the depth of the non-flat object at different points.

In one embodiment, the method for determining depth using the diffraction pattern is set forth in Prime Sense US Published Application No. 20100007717, the disclosure of which is hereby incorporated herein by reference. Additional details of one embodiment are set forth in PCT Publication WO 2007/043036, which describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT Publication WO 2007/105205. The disclosures of PCT Publication WO 2007/043036 and PCT Publication WO 2007/105205 are hereby incorporated herein by reference.

In one embodiment, a program in memory 804 controls microcontroller 802 to combine images from camera 810 with depth information from optical projection module 806 to provide a composite image of a person's face. Facial recognition software can then compare the face to stored faces, either in the device or in the cloud. Such comparison can be used, for example, to authenticate a person as authorized to operate the electronic device or a program on the device. Alternately, it can be used to match a person to a face detected on a social media platform or other platform or application.

Improved Optical Projector Using Both Conjugate Images

In one embodiment, the present invention allows both conjugate images of an off-axis hologram to be used. With an on-axis hologram, the image reconstruction propagates along the direction of the incident laser beam. Only one image will be reconstructed from the +1, −1 and other diffractive orders. The image will include the optical axis of the incident laser beam, but can be non-symmetrical about the optical axis of the incident laser beam. A non-perfect on-axis hologram will have at least three diffraction orders. All of them propagate along the optical axis of the incident laser beams and are not separable.

An off-axis hologram, in contrast, will have diffracted beams propagate at an angle with respect to the incident laser beam direction. In an off-axis Fourier transform hologram the +1 order image and the −1 order image are symmetrical about the optical axis.

Figure 10:
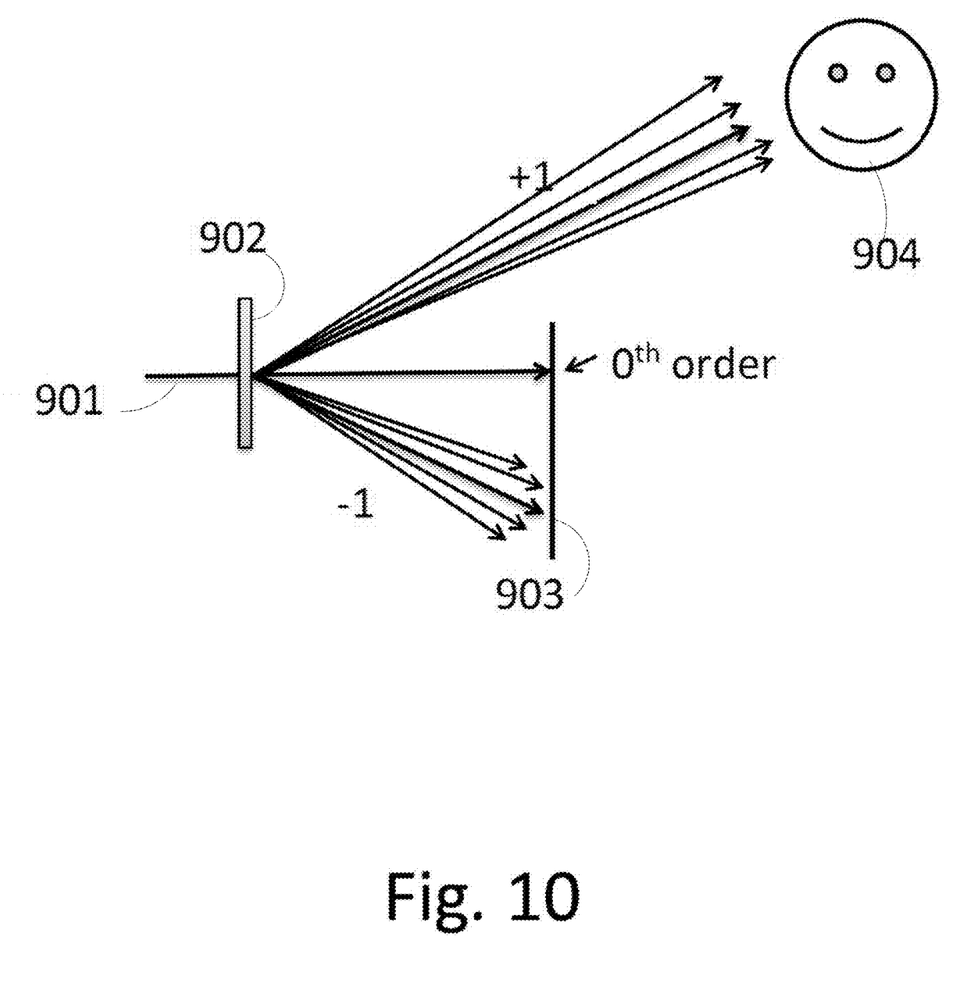
FIG. 10 is a diagram of an optical projector with off-axis hologram according to another embodiment.

FIG. 10 shows the principle of an optical projector with an off-axis hologram as used in the embodiments of FIGS. 4-6 described above. A collimated laser beam 901 illuminates an off-axis hologram 902. Hologram 902 has an array of structured dots recorded on it to produce a dot image. The 0th order and −1st order beams are blocked by a stop 903. The +1st order beam is projected to the surface of an object 904, with the system being position so the object 904 is in the path of the +1$^{st}$ order beam, rather than being along the 0-order beam axis. The embodiments of FIGS. 3-6 use a mirror to project one side of the diffraction pattern so it is blocked. Thus, either the +1 order or the −1 order is lost, with a loss of half the power or illumination. The efficiency of such a binary phase off-axis hologram is typically less than 40 percent in one of its diffracted orders.

The present invention describes an optical projector for use in motion detection, 3D face recognition, or other uses, which uses an off-axis hologram and yet can achieve light efficiency of more than 50 percent.

The structured dots required by the optical projector are recorded in an off-axis hologram. The hologram is formed on a substrate that is transparent to light, in particular to infrared light. In one example, the hologram is embossed on a PET substrate.

The optical projector includes a first stage that reconstructs the two conjugate images of the structured dots with a center $0^{th}$ diffracted order. The $0^{th}$ order is then blocked. The +/−1st order of the structured dots are then projected through a multiple beam grating to the object for motion sensing, 3D face recognition, etc. The use of both the +/−1st order conjugate images results in doubling the light efficiency for the optical projector using an off-axis hologram. The advantage over an on-axis implementation, which theoretically eliminates the $0^{th}$ order, is that the problems of the $0^{th}$ order appearing as a result of a design error or a fabrication error don't have to be dealt with.

Figure 11:
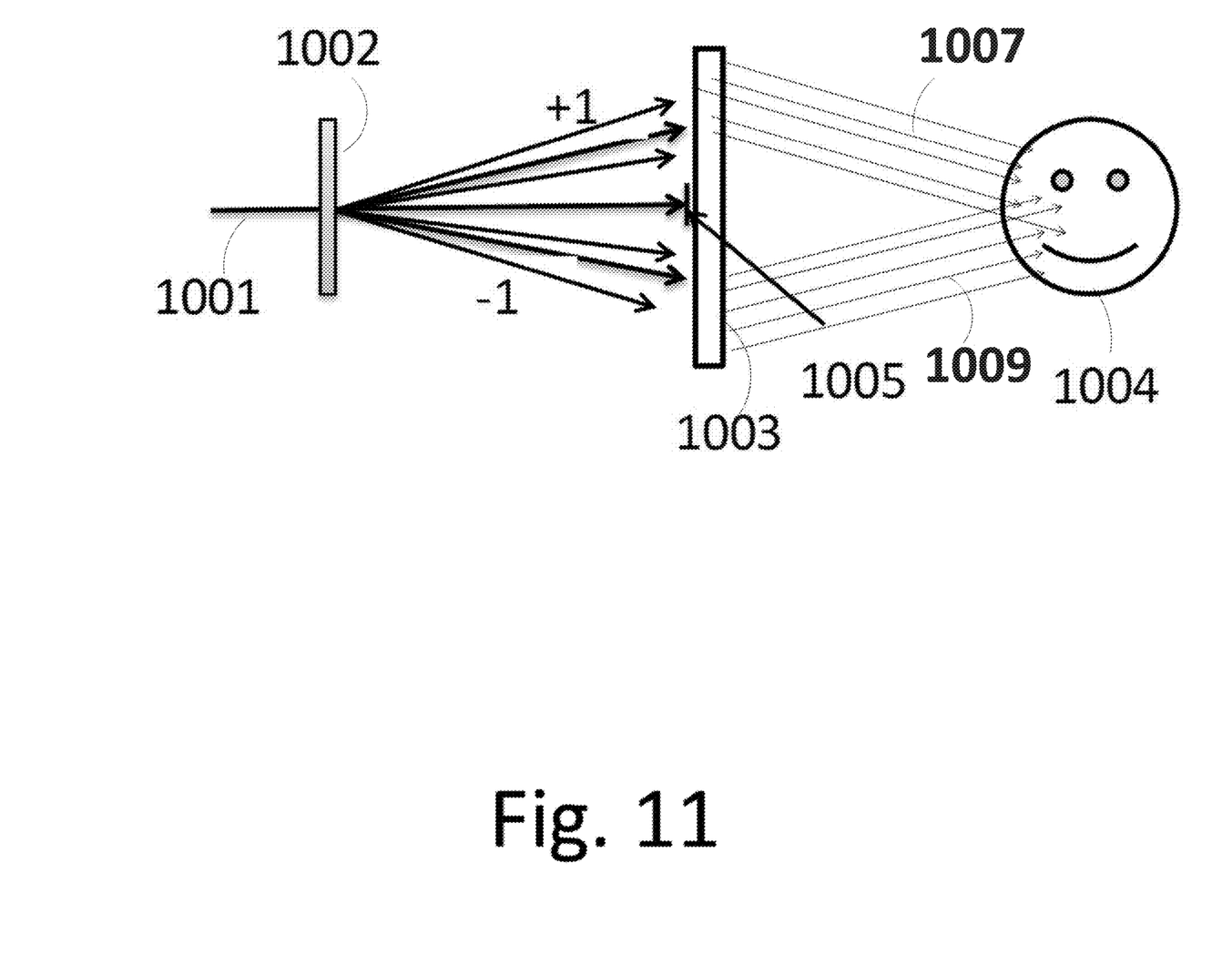
FIG. 11 is a diagram of another embodiment of an improved optical projector with off-axis hologram using a collimated laser beam.

FIG. 11 illustrates a first embodiment using a collimated beam laser. A collimated laser beam 1001 illuminates an off-axis hologram 1002. The off-axis hologram 1002 is constructed to produce conjugate $1^{st}$ order diffracted beams on either side of the 0 order beam. The −1st, 0th, and +1st order beams from the hologram are projected to a multiple beam grating 1003. A opaque dot 1005 is placed on or near the multiple beam grating to stop the $0^{th}$ order. The multiple beam grating will duplicate the +1st and −1st order images and project them (represented by lines 1007 and 1009) to the object 1004. The opaque dot 1005 is metal in one embodiment, and is metal that is diffusely reflective. It is diffusely reflective to minimize further reflections off an interior of an optical module that could interfere with the images. In one embodiment, the laser is an infrared laser. In one embodiment, the laser is an edge emitting laser.

In one embodiment, the multiple beam grating (MBG) 1003 is manufactured using the same techniques used to make the hologram as described above. The MBG is formed on a substrate that is transparent to light, in particular to infrared light. One practical method for making the MBG is to first record its spatial structure on a glass plate coated with a layer of photoresist. After development of the photoresist plate, its surface structure is duplicated to a nickel shim which is then used as the master to a UV polymer embossing process to transfer the MBG structure to a PET substrate.

Figure 12:
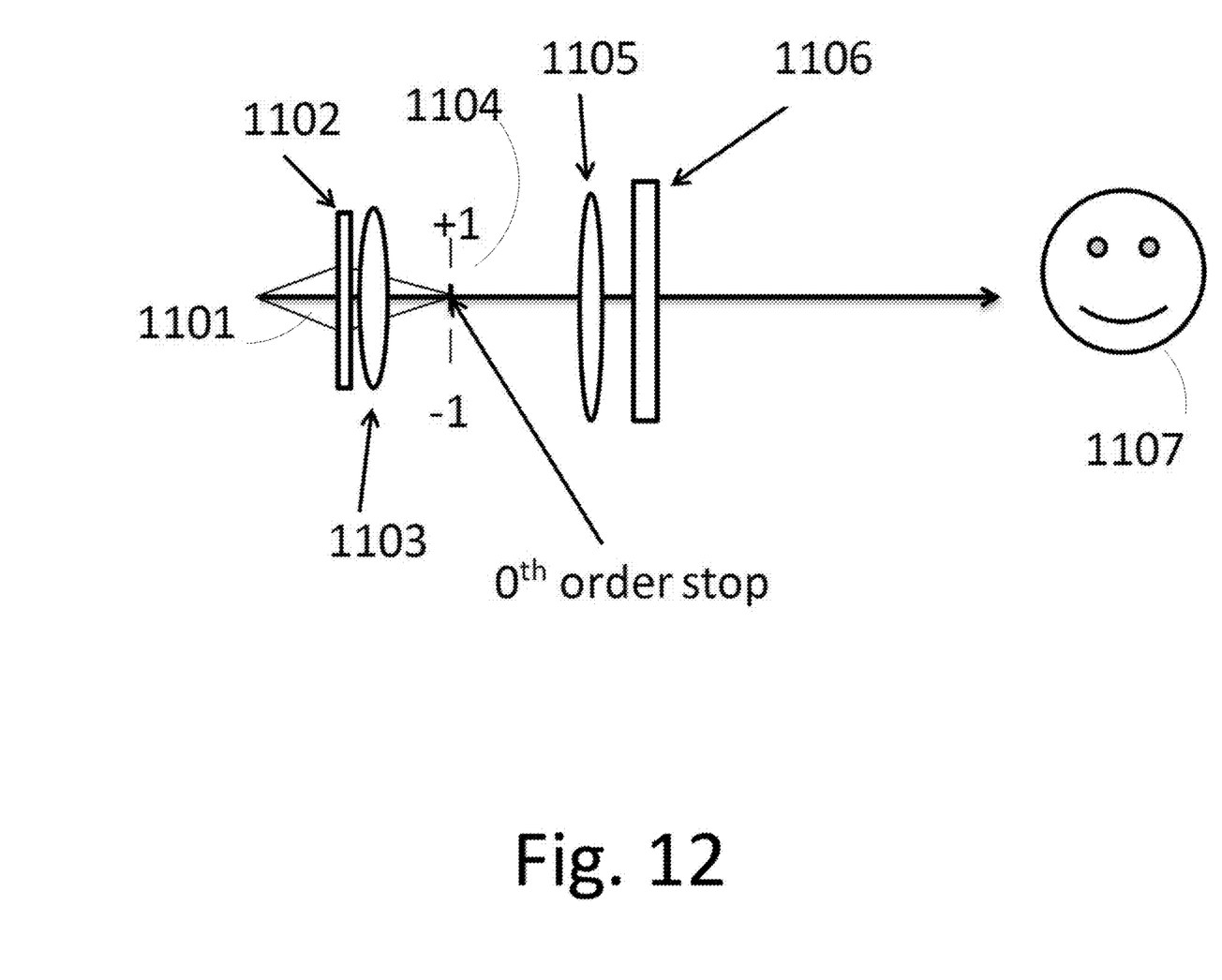
FIG. 12 is a diagram of another embodiment of improved optical projector with off-axis hologram using a diverging laser beam.

FIG. 12 shows a second embodiment of the present invention. A diverging laser beam 1101 illuminates the off-axis hologram 1102. A first lens 1103 reconstructs the +1/−1 order of the recorded image of the structured dots from the hologram 1102 onto plane 1104. An opaque dot is placed at plane 1104 to stop the 0th order beam. The reconstructed images on plane 1104 is then projected by a second lens 1105 through a multiple beam grating 1106 to the surface of the object on plane 1107. Thus, instead of requiring a collimated laser beam from the laser or a laser module, the first lens can provide the focusing of the 0 order beam to where it can be selectively blocked, with the second lens then providing the divergence of the image to project it onto object 1107, after splitting into multiple images by MBG 1106.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. An apparatus comprising:
   a laser configured to produce a laser beam along an axis;
   a Fourier transform hologram element having an off-axis diffraction pattern and mounted to intercept the laser beam and having a pattern that produces a 0-order beam and two, conjugate images which are on either side of the 0-order beam;
   a multiple beam grating mounted to intercept the two, conjugate images and patterned to multiply the images, redirect the images along the axis and direct the images onto an object; and
   a blocking element, mounted proximate the multiple beam grating, having an opaque portion positioned to block the 0-order beam.

2. The apparatus of claim 1 wherein the laser is a collimated beam laser.

3. The apparatus of claim 1 wherein the multiple beam grating is patterned to direct the images onto the object along the axis of the 0-order beam.

4. The apparatus of claim 1 wherein the laser beam is in the infrared spectrum and the opaque portion of the blocking element is opaque to infrared light.

5. The apparatus of claim 1 wherein the opaque portion is metal.

6. The apparatus of claim 1 wherein the laser is an edge emitting laser.

7. The apparatus of claim 1 wherein the laser is a vertical cavity surface emitting laser (VCSEL).

8. An apparatus comprising:
   a laser configured to produce a laser beam;
   a hologram element having an off-axis diffraction pattern and mounted to intercept the laser beam and having a pattern that produces a 0-order beam and two, conjugate images which are on either side of the 0-order beam;
   a multiple beam grating mounted to intercept the two, conjugate images and patterned to both multiply the images and direct the images onto an object; and
   a blocking element, mounted proximate the multiple beam grating, having an opaque portion positioned to block the 0-order beam;
   wherein the blocking element comprises a transparent film having an opaque dot positioned to block the 0-order beam.

9. An apparatus comprising:
   a laser configured to produce a laser beam;
   a hologram element having an off-axis diffraction pattern and mounted to intercept the laser beam and having a pattern that produces a 0-order beam and two, conjugate images which are on either side of the 0-order beam;
   a multiple beam grating mounted to intercept the two, conjugate images and patterned to both multiply the images and direct the images onto an object; and a blocking element, mounted proximate the multiple beam grating, having an opaque portion positioned to block the 0-order beam;

wherein the laser is a diverging beam laser, and further comprising:

a first lens mounted between the hologram element and the multiple beam grating, constructed to reconstruct an image from the hologram element as a reconstructed image on a reconstructed image plane; and a second lens mounted between the reconstructed image plane and the multiple beam grating and constructed to project the reconstructed image through the multiple beam grating onto the object.

10. An apparatus comprising:

a laser configured to produce a laser beam;

a hologram element having an off-axis diffraction pattern and mounted to intercept the laser beam and having a pattern that produces a 0-order beam and two, conjugate images which are on either side of the 0-order beam;

a multiple beam grating mounted to intercept the two, conjugate images and patterned to both multiply the images and direct the images onto an object; and a blocking element, mounted proximate the multiple beam grating, having an opaque portion positioned to block the 0-order beam;

wherein opaque portion of the blocking element is a reflective element with a low reflective, light diffusing surface such that any reflected portion of the 0-order beam is less bright than a second order diffraction beam.

11. An electronic device comprising:

an optical projector module including:

a laser configured to produce a laser beam along an axis;

a Fourier transform hologram element having an off-axis diffraction pattern and mounted to intercept the laser beam and having a pattern that produces a 0-order beam and two, conjugate images which are on either side of the 0-order beam;

a multiple beam grating mounted to intercept the two, conjugate images and patterned to multiply the conjugate images, redirect the images along the axis and direct the conjugate images onto an object; and a blocking element, mounted proximate the multiple beam grating, having an opaque portion positioned to block the 0-order beam, and a photodetector;

a microprocessor;

a memory containing non-transitory computer readable media with instructions for:

recording the first positions of a plurality of elements of the conjugate images as reflected off a flat surface and detected by the photodetector;

recording the second positions of a plurality of elements of the conjugate images as reflected of a non-flat object to be measured;

determining the difference between the first and second positions for the plurality of elements of the conjugate images as reflected; and generating a map of the depth of the non-flat object at different points based on the difference between the first and second positions for the plurality of elements of the conjugate images as reflected.

12. The electronic device of claim 11 wherein the electronic device is a smartphone.

13. A method comprising:

producing a laser beam along an axis;

intercepting the laser beam with a Fourier transform hologram element and producing a 0-order beam and two off-axis conjugated images which are on either side of the 0-order beam;

intercepting the two, conjugate images with a multiple beam grating and multiplying each of the conjugate images to produce a plurality of images, redirecting the images along the axis and directing the plurality of conjugate images onto an object;

blocking the 0-order beam with an opaque portion of a blocking element mounted proximate the multiple beam grating; and detecting, with a photodetector, a reflection of the plurality of images off the object.

14. The method of claim 13 further comprising collimating the laser beam.

15. The method of claim 13 further comprising directing the plurality of images, with the multiple beam grating, onto the object along an axis of the 0-order beam.

16. The method of claim 13 further comprising:

recording first positions of a plurality of elements of the plurality of images as reflected off a flat surface and detected by the photodetector;

recording second positions of a plurality of elements of the plurality of images as reflected of a non-flat object to be measured;

determining the difference between the first and second positions for the plurality of elements of the off-axis diffraction pattern as reflected; and generating a map of the depth of the non-flat object at different points based on the difference between the first and second positions for the plurality of elements of the plurality of images as reflected.

17. The method of claim 13 wherein the laser is an edge emitting laser.

18. The method of claim 13 wherein the laser is a vertical cavity surface emitting laser (VCSEL).

19. A method comprising:

producing a laser beam;

intercepting the laser beam with a hologram element and producing a 0-order beam and two off-axis conjugated images which are on either side of the 0-order beam;

intercepting the two, conjugate images with a multiple beam grating and multiplying each of the conjugate images to produce a plurality of images and directing the plurality of conjugate images onto an object;

blocking the 0-order beam with an opaque portion of a blocking element mounted proximate the multiple beam grating; and detecting, with a photodetector, a reflection of the plurality of images off the object, wherein the laser is a diverging beam laser, and further comprising:

reconstructing, with a first lens, an image from the hologram element as a reconstructed image on a reconstructed image plane; and projecting, with a second lens, the reconstructed image through the multiple beam grating onto the object.

20. A method comprising:

producing a laser beam;

intercepting the laser beam with a hologram element and producing a 0-order beam and two off-axis conjugated images which are on either side of the 0-order beam;

intercepting the two, conjugate images with a multiple beam grating and multiplying each of the conjugate images to produce a plurality of images and directing the plurality of conjugate images onto an object;

blocking the 0-order beam with an opaque portion of a blocking element mounted proximate the multiple beam grating; and detecting, with a photodetector, a reflection of the plurality of images off the object;

wherein the blocking is done by a blocking element comprising a transparent film having an opaque dot positioned to block the 0-order beam.

* * * * *

UNITED STATES PATENT AND TRADEMARK OFFICE
CERTIFICATE OF CORRECTION

PATENT NO. : 10,545,457 B2  
APPLICATION NO. : 16/297495  
DATED : January 28, 2020  
INVENTOR(S) : Wai-Hon Lee Page 1 of 1

It is certified that error appears in the above-identified patent and that said Letters Patent is hereby corrected as shown below:

In the Claims

Column 10, Claim 16, Line 27, remove "as reflected of a" and insert --as reflected off a--

Signed and Sealed this  
Nineteenth Day of May, 2020

Andrei Iancu  
*Director of the United States Patent and Trademark Office*